(12) United States Patent
Sarhan

(10) Patent No.: US 8,884,465 B2
(45) Date of Patent: Nov. 11, 2014

(54) SYSTEM AND METHOD FOR OVER-VOLTAGE PROTECTION IN A PHOTOVOLTAIC SYSTEM

(75) Inventor: Sameh Sarhan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 725 days.

(21) Appl. No.: 12/762,134

(22) Filed: Apr. 16, 2010

(65) Prior Publication Data

US 2010/0269883 A1   Oct. 28, 2010

Related U.S. Application Data

(60) Provisional application No. 61/170,585, filed on Apr. 17, 2009.

(51) Int. Cl.
| | |
|---|---|
| *H02J 1/00* | (2006.01) |
| *H02J 3/00* | (2006.01) |
| *H02H 7/00* | (2006.01) |
| *H02H 9/00* | (2006.01) |
| *H02M 1/32* | (2007.01) |

(52) U.S. Cl.
CPC . *H02M 1/32* (2013.01); *Y02E 10/56* (2013.01)
USPC .................................. 307/82; 307/77; 361/18

(58) Field of Classification Search
USPC ........................ 361/15, 58; 307/66, 71, 77, 82
See application file for complete search history.

(56) References Cited

U.S. PATENT DOCUMENTS

| | | |
|---|---|---|
| 3,740,636 A | 6/1973 | Hogrefe et al. |
| 4,129,788 A | 12/1978 | Chavannes |
| 4,189,765 A | 2/1980 | Kotalik et al. |
| 4,280,097 A | 7/1981 | Carey et al. |
| 4,688,538 A | 8/1987 | Ward et al. |
| 4,725,740 A | 2/1988 | Nakata |
| 5,284,719 A | 2/1994 | Landau et al. |
| 5,307,006 A | 4/1994 | Rankin et al. |

(Continued)

FOREIGN PATENT DOCUMENTS

| | | |
|---|---|---|
| EP | 1 239 573 A1 | 9/2002 |
| ES | 2 249 147 B1 | 5/2007 |

(Continued)

OTHER PUBLICATIONS

Office Action dated Sep. 21, 2011 in connection with U.S. Appl. No. 12/456,777.

(Continued)

*Primary Examiner* — Jared Fureman
*Assistant Examiner* — Rasem Mourad
(74) *Attorney, Agent, or Firm* — Andrew Viger; Frederick J. Telecky, Jr.

(57) ABSTRACT

A photovoltaic array for use in an electrical power system includes multiple photovoltaic modules and a voltage converter coupled to at least one of the photovoltaic modules. The photovoltaic array also includes an over-voltage protection circuit. The over-voltage protection circuit includes an interface adapted to couple to an output of the voltage converter. The over-voltage protection circuit also includes a spike detector configured to detect a voltage spike in an output voltage of the voltage converter. The over-voltage protection circuit further includes a voltage control module configured to regulate an output voltage slew rate of the voltage converter in response to an over-voltage signal received from the spike detector.

19 Claims, 4 Drawing Sheets

(56) References Cited

U.S. PATENT DOCUMENTS

| | | | |
|---|---|---|---|
| 5,408,404 A | 4/1995 | Mitchell | |
| 5,412,308 A | 5/1995 | Brown | |
| 5,528,125 A | 6/1996 | Marshall et al. | |
| 5,600,247 A | 2/1997 | Matthews | |
| 5,604,430 A | 2/1997 | Decker et al. | |
| 5,659,465 A | 8/1997 | Flack et al. | |
| 5,666,040 A | 9/1997 | Bourbeau | |
| 5,669,987 A | 9/1997 | Takehara et al. | |
| 5,747,967 A | 5/1998 | Muljadi et al. | |
| 5,751,120 A | 5/1998 | Zeitler et al. | |
| 5,892,354 A | 4/1999 | Nagao et al. | |
| 6,169,678 B1 | 1/2001 | Kondo et al. | |
| 6,184,656 B1 | 2/2001 | Karunasiri et al. | |
| 6,281,485 B1 | 8/2001 | Siri | |
| 6,331,670 B2 | 12/2001 | Takehara et al. | |
| 6,369,576 B1 | 4/2002 | Matthews et al. | |
| 6,608,404 B2 | 8/2003 | Schienbein et al. | |
| 6,633,823 B2 | 10/2003 | Bartone et al. | |
| 6,636,431 B2 | 10/2003 | Seki et al. | |
| 6,717,519 B2 | 4/2004 | Kobayashi et al. | |
| 6,734,652 B1* | 5/2004 | Smith | 320/163 |
| 6,750,391 B2 | 6/2004 | Bower et al. | |
| 6,844,739 B2 | 1/2005 | Kasai et al. | |
| 6,850,820 B2 | 2/2005 | Tajima | |
| 6,966,184 B2 | 11/2005 | Toyomura et al. | |
| 6,975,522 B2 | 12/2005 | Asano | |
| 6,984,967 B2 | 1/2006 | Notman | |
| 7,038,437 B2* | 5/2006 | Kenny et al. | 323/283 |
| 7,046,527 B2 | 5/2006 | West | |
| 7,477,080 B1 | 1/2009 | Fest | |
| 7,566,828 B2 | 7/2009 | Sasaki | |
| 7,605,498 B2* | 10/2009 | Ledenev et al. | 307/80 |
| 7,619,200 B1* | 11/2009 | Seymour et al. | 250/214 R |
| 7,701,083 B2 | 4/2010 | Savage | |
| 7,723,865 B2 | 5/2010 | Kitanaka | |
| 7,759,903 B2 | 7/2010 | Kamata | |
| 7,843,085 B2 | 11/2010 | Ledenev et al. | |
| 7,925,552 B2 | 4/2011 | Tarbell et al. | |
| 7,964,837 B2* | 6/2011 | Seymour et al. | 250/214 R |
| 2002/0038667 A1 | 4/2002 | Kondo et al. | |
| 2003/0201674 A1 | 10/2003 | Droppo et al. | |
| 2004/0135545 A1 | 7/2004 | Fowler et al. | |
| 2005/0105224 A1 | 5/2005 | Nishi | |
| 2005/0257827 A1 | 11/2005 | Gaudiana et al. | |
| 2006/0017327 A1 | 1/2006 | Siri et al. | |
| 2006/0149607 A1 | 7/2006 | Sayers et al. | |
| 2006/0162772 A1 | 7/2006 | Presher, Jr. et al. | |
| 2006/0171182 A1 | 8/2006 | Siri et al. | |
| 2006/0176036 A1 | 8/2006 | Flatness et al. | |
| 2006/0176040 A1* | 8/2006 | Kernahan et al. | 323/299 |
| 2007/0024257 A1 | 2/2007 | Boldo | |
| 2007/0137688 A1 | 6/2007 | Yoshida | |
| 2007/0164612 A1 | 7/2007 | Wendt et al. | |
| 2008/0013347 A1 | 1/2008 | Deng et al. | |
| 2008/0087321 A1 | 4/2008 | Schwartzman | |
| 2008/0097655 A1 | 4/2008 | Hadar et al. | |
| 2008/0143188 A1 | 6/2008 | Adest et al. | |
| 2008/0147335 A1 | 6/2008 | Adest et al. | |
| 2008/0150366 A1 | 6/2008 | Adest et al. | |
| 2008/0278983 A1 | 11/2008 | Park | |
| 2009/0039852 A1 | 2/2009 | Fishelov et al. | |
| 2009/0140719 A1 | 6/2009 | Hasenfus | |
| 2009/0141522 A1* | 6/2009 | Adest et al. | 363/55 |
| 2009/0242011 A1 | 10/2009 | Proisy et al. | |
| 2009/0283128 A1 | 11/2009 | Zhang et al. | |
| 2009/0283129 A1 | 11/2009 | Foss | |
| 2009/0284078 A1 | 11/2009 | Zhang et al. | |
| 2009/0284232 A1 | 11/2009 | Zhang et al. | |
| 2009/0284240 A1 | 11/2009 | Zhang et al. | |
| 2009/0284998 A1 | 11/2009 | Zhang et al. | |
| 2009/0289502 A1 | 11/2009 | Batarseh et al. | |
| 2010/0001587 A1 | 1/2010 | Casey et al. | |
| 2010/0126550 A1 | 5/2010 | Foss | |
| 2010/0201339 A1* | 8/2010 | Newman | 323/311 |
| 2010/0288327 A1 | 11/2010 | Lisi et al. | |
| 2010/0327659 A1* | 12/2010 | Lisi et al. | 307/82 |

FOREIGN PATENT DOCUMENTS

| | | |
|---|---|---|
| JP | 07-234733 A | 9/1995 |
| JP | 08-123563 A | 5/1996 |
| JP | 08-314555 A | 11/1996 |
| JP | 10014105 A | 1/1998 |
| JP | 10155240 A | 6/1998 |
| JP | 11098679 A | 4/1999 |
| JP | 2000112545 A | 4/2000 |
| JP | 2000116010 A | 4/2000 |
| JP | 2003134661 A | 5/2003 |
| JP | 2003216255 A | 7/2003 |
| JP | 2005-151662 | 6/2005 |
| JP | 2005243852 A | 9/2005 |
| JP | 2005252172 A | 9/2005 |
| JP | 2006134118 A | 5/2006 |
| JP | 2006216660 A | 8/2006 |
| JP | 2006-320149 | 11/2006 |
| JP | 2007-133765 | 5/2007 |
| KR | 100757320 B1 | 9/2007 |
| KR | 20080010116 A | 1/2008 |
| KR | 100886891 B1 | 3/2009 |
| KR | 1020090133036 A | 12/2009 |
| WO | WO 2007/084196 A2 | 7/2007 |

OTHER PUBLICATIONS

Office Action dated Aug. 30, 2011 in connection with U.S. Appl. No. 12/386,958.

Office Action dated Dec. 9, 2011 in connection with U.S. Appl. No. 12/454,244.

Office Action dated Dec. 30, 2011 in connection with U.S. Appl. No. 12/456,776.

Office Action dated Jan. 25, 2012 in connection with U.S. Appl. No. 12/454,136.

Office Action dated Nov. 25, 2011 in connection with U.S. Appl. No. 12/272,990.

"Micropower Synchronous, Buck-Boost DC/DC Converter", MiniLogic Device Corporation, Sep. 2005, p. 1-13.

Geoffrey R. Walker, et al., "Cascaded DC-DC Converter Connection of Photovoltaic Modules", IEEE Transactions on Power Electronics, vol. 19, No. 4, Jul. 2004, p. 1130-1139.

"PV FAQs", U.S. Department on Energy, Jan. 2004, 2 pages.

"Perspectives of Concentrating Solar Power", Renewable Energy India 2008 Expo, Aug. 22, 2008, 16 pages.

"APEC 2008, 23rd Annual Applied Power Electronics Conference and Exposition", vol. 1, Seminars 1-6, Feb. 24-28, 2008, Austin, Texas, 89 pages.

Yunwei Li, et al, "Design, Analysis, and Real-Time Testing of a Controller for Multibus Microgrid System", IEEE Transactions on Power Electronics, vol. 19, No. 5, Sep. 2004, p. 1195-1204.

R.N. Lasseter, "MicroGrids", 2002 IEEE Power Engineering Society Winter Meeting, vol. 1, Jan. 2002, p. 305-308.

John Stevens, "Development of Sources and a Testbed for CERTS Microgrid Testing", 2004 IEEE Power Engineering Society General Meeting, Jun. 2004, p. 1-2.

Mike Barnes, et al., "Real-World MicroGrids—An Overview", 2007 IEEE SoSE International Conference, Apr. 2007, p. 1-8.

Paolo Piagi, et al., "Autonomous Control of Microgrids", IEEE Power Engineering Society General Meeting, Jun. 2006, 8 pages.

Y. Zoka, et al., "An Interaction Problem of Distributed Generators Installed in a MicroGrid", 2004 IEEE International Conference on Electric Utility Deregulation, Restructuring and Power Technologies (DRPT2004), Apr. 2004, Hong Kong, p. 795-799.

M.P.F. Hommelberg, et al., "Distributed Control Concepts using Multi-Agent technology and Automatic Markets: An indispensable feature of smart power grids", 2007 IEEE Power Engineering Society General Meeting, Jun. 2007, p. 1-7.

Notification of Transmittal of the International Search Report and the Written Opinion of the International Searching Authority, or the Declaration dated Dec. 17, 2009 in connection with PCT Application No. PCT/US2009/044033.

(56) References Cited

OTHER PUBLICATIONS

Guo Heng, et al., "A Novel Maximum Power Point Tracking Strategy for Stand-along Solar Pumping Systems", 2005 IEEE, 5 pages.

Debosmita Das, et al., "An Optimal Design of a Grid Connected Hybrid Wind/Photovoltaic/Fuel Cell System for Distributed Energy Production", 2005 IEEE, p. 2499-2504.

Claus Bjerge, et al., "How to run an offshore wind farm like a conventional power plant", www.modernpowersystems.com, Jan. 2007, 4 pages.

Steven Anderson, "Remote . . . But Not Economically Out of Reach", Power and Energy, Dec. 15, 1986, 5 pages.

Qihi Liu, et al., "Novel Modeling and Control of Doubly-Fed Variable-Speed Constant-Frequency Wind Power Generator", The 33rd Annual Conference of the IEEE Industrial Electronics Society (IECON), Nov. 5-8, 2007, p. 1621-1626.

Casisheng Wang, "Modeling and Control of Hybrid Wind/Photovoltaic/Fuel Cell Distributed Generation Systems", Jul. 2006, Montana State University, 403 pages.

Notification of Transmittal of the International Search Report and the Written Opinion of the International Searching Authority, or the Declaration dated Dec. 23, 2009 in connection with International Patent Application No. PCT/US2009/044036.

Jianhui Zhang, et al., "Active Cell and Module Balancing for Batteries or Other Power Supplies", U.S. Appl. No. 12/882,781, filed Sep. 15, 2010.

Ramesh Khanna, "Solar-Powered Battery Charger and Related System and Method", U.S. Appl. No. 12/589,984, filed Oct. 30, 2009.

Andrew Foss, "System and Method for Solar Panel Array Analysis", U.S. Appl. No. 12/386,958, filed Apr. 24, 2009.

Gianpado Lisi, et al., "Off-Grid Led Street Lighting System With Multiple Panel-Storage Matching", U.S. Appl. No. 12/925,110, filed Oct. 14, 2010.

Notification of Transmittal of the International Search Report and the Written Opinion of the International Searching Authority, or the Declaration dated Dec. 24, 2009 in connection with International Patent Application No. PCT/US2009/044019.

Carlos Meza, et al., "Boost-Buck inverter variable structure control for grid-connected photovoltaic systems", 2005 IEEE, p. 1318-1321.

Mikihiko Matsui, et al., "A New Maximum Photovoltaic Power Tracking Control Scheme Based on Power Equilibrium at DC Link", 1999 IEEE, p. 804-809.

Notification of Transmittal of the International Search Report and the Written Opinion of the International Searching Authority, or the Declaration dated Dec. 23, 2009 in connection with PCT Application No. PCT/US2009/044027.

Notification of Transmittal of the International Search Report and the Written Opinion of the International Searching Authority, or the Declaration dated Dec. 23, 2009 in connection with PCT Application No. PCT/US2009/044015.

Jianhui Zhang, et al., "Method and System for Providing Central Control in a Energy Generating System", U.S. Appl. No. 12/152,479, filed May 14, 2008.

Stephen W. Moore, et al., "A Review of Cell Equalization Methods for Lithium Ion and Lithium Polymer Battery Systems", Society of Automotive Engineers, Inc., 2001, 5 pages.

Sihua Wen, "Cell balancing buys extra run time and battery life", Analog Applications Journal, 2009, 8 pages.

"Five to Ten Series Cell Lithium-Ion or Lithium-Polymer battery Protector and Analog Front End", Texas Instruments, Jun. 2008, 60 pages.

"Li-Ion, NiMH Battery Measuring, Charge Balancing and Power-supply Circuit", Atmel Corporation, Oct. 2009, 55 pages.

Werner Rößler, "Boost battery performance with active charge-balancing", EE Times-Asia, Jul. 16-31, 2008, p. 1-3.

Notification of Transmittal of the International Search Report and the Written Opinion of the International Searching Authority, or the Declaration dated Dec. 31, 2010 in connection with PCT Application No. PCT/US2010/031462.

Notification of Transmittal of the International Search Report and the Written Opinion of the International Searching Authority, or the Declaration dated Jan. 3, 2011 in connection with PCT Application No. PCT/US2010/031505.

Notification of Transmittal of the International Search Report and the Written Opinion of the International Searching Authority, or the Declaration dated Jan. 13, 2011 in connection with PCT Application No. PCT/US2010/034783.

\* cited by examiner

SYSTEM AND METHOD FOR OVER-VOLTAGE PROTECTION IN A PHOTOVOLTAIC SYSTEM

CROSS-REFERENCE TO RELATED APPLICATIONS AND PRIORITY CLAIM

This application claims priority under 35 U.S.C. §119(e) to U.S. Provisional Patent Application No. 61/170,585 filed on Apr. 17, 2009, which is hereby incorporated by reference.

TECHNICAL FIELD

The present application relates generally to electrical power systems and, more specifically, to a system and method for over-voltage protection in a photovoltaic power system.

BACKGROUND

Photovoltaic ("PV") panels (also referred to as "solar panels") use radiant light from the sun to produce electrical energy. The solar panels include a number of PV cells to convert the sunlight into the electrical energy. The majority of solar panels use wafer-based crystalline silicon cells or a thin-film cell based on cadmium telluride or silicon. Crystalline silicon, which is commonly used in the wafer form in PV cells, is derived from silicon, a commonly used semi-conductor. PV cells are semiconductor devices that convert light directly into energy. When light shines on a PV cell, a voltage develops across the cell, and a current flows through the cell when connected to a load. The voltage and current vary with several factors, including the physical size of the cell, the amount of light shining on the cell, the temperature of the cell, and external factors.

A solar panel (also referred to as a "PV module") is made of PV cells arranged in series and in parallel. For example, the PV cells are first coupled in series within a group. Then, a number of the groups are coupled together in parallel. Likewise, a PV array (also referred to as a "solar array") is made of solar panels arranged in series and in parallel.

The electrical power generated by each solar panel is determined by the solar panel's voltage and current. In a solar array, electrical connections are made in series to achieve a desired output string voltage and/or in parallel to provide a desired amount of string current source capability. In some cases, each panel voltage is boosted or bucked with a DC-DC converter.

The solar array is connected to an electrical load, an electrical grid or an electrical power storage device, such as (but not limited to) battery cells. The solar panels delivery direct current (DC) electrical power. When the electrical load, electrical grid or electrical power storage device operates using an alternating current (AC) (for example, sixty cycles per second or 60 Hz), the solar array is connected to the electrical load, electrical grid, or electrical power storage device, through a DC-AC inverter.

Often, a solar panel is capable of large and fast power transients. During these transients, the difference between the power generated by the solar panel and the power put on the grid by the inverter (e.g., in the case of a solar array connected to the grid) is stored and released by an electrical energy storage device (e.g., an inverter input capacitor). Under certain conditions referred to as a string over-voltage, the power difference can cause the inverter input voltage to exceed the inverter's maximum rating, causing severe and permanent damage to the inverter.

SUMMARY

This disclosure provides a system and method for over-voltage protection of a photovoltaic system.

A photovoltaic array for use in an electrical power system is provided. The photovoltaic array includes multiple photovoltaic modules and a voltage converter. The voltage converter is coupled to at least one of the photovoltaic modules. The photovoltaic array further includes an over-voltage protection circuit. The over-voltage protection circuit includes an interface adapted to couple to an output of the voltage converter. The over-voltage protection circuit also includes a spike detector configured to detect a voltage spike in an output voltage of the voltage converter. The over-voltage protection circuit further includes a voltage control module configured to regulate an output voltage slew rate of the voltage converter in response to an over-voltage signal received from the spike detector.

A device for use in a solar cell power system is also provided. The device includes an interface adapted to couple to an output of a voltage converter. The device also includes a spike detector configured to detect a voltage spike in an output voltage of the voltage converter. The device further includes a voltage control module configured to regulate an output voltage slew rate of the voltage converter in response to an over-voltage signal received from the spike detector.

A method for over-voltage avoidance in a photovoltaic array is further provided. The method includes sensing an output voltage of a voltage converter. The method further includes detecting an over-voltage event based on a rate of change of the output voltage exceeding a threshold value. The method also includes regulating the voltage converter in response to the detection of the over-voltage event.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged photovoltaic array system.

Figure 1:
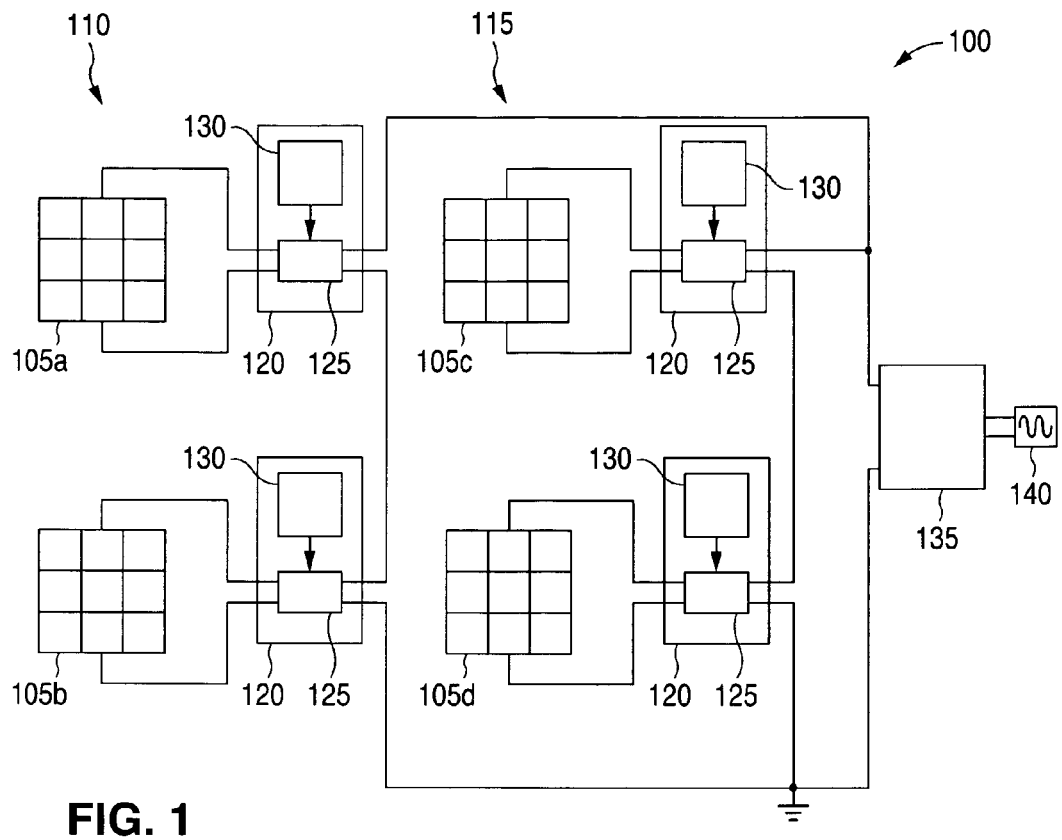
FIG. 1 illustrates an example photovoltaic (PV) array system according to embodiments of this disclosure.

FIG. 1 illustrates an example photovoltaic (PV) array system 100 according to embodiments of this disclosure. The embodiment of the PV array system 100 shown in FIG. 1 is for illustration only. Other embodiments of the PV array system 100 could be used without departing from the scope of this disclosure.

The PV array system 100 includes a number of solar panels 105a-105d (referred to collectively as solar panels 105). The solar panels 105 are arranged in series, in parallel, or both. For example, a first string 110 includes solar panel 105a coupled in series with solar panel 105b, while a second string 115 includes solar panel 105c coupled in series with solar panel 105d. Additionally, the first string 110 is coupled in parallel with the second string 115. Further, the voltage across each respective string 110 or 115 is referred to as the string voltage, and the current through each respective string 110 or 115 is referred to as the string current.

The PV array system 100 also includes a DC-AC inverter 135. Each solar panel 105 is coupled to the DC-AC inverter 135. The solar panels 105 can be coupled in series with one or more additional solar panels 105 to the DC-AC inverter 135. Additionally, and alternatively, the solar panels 105 can be coupled in parallel with one or more additional solar panels 105 to the DC-AC inverter 135. The DC-AC inverter 135 extracts power from the PV array system 100 and converts the extracted power from DC to AC for interconnection with a power distribution grid ("grid") 140.

Each string 110, 115 of the PV array system 100 is sized according to a specified size for operation with the DC-AC inverter 135. The specified size is determined such that the sum of the open-circuit voltage of all the solar panels 105 in a string 110, 115 cannot exceed a maximum input voltage rating of the DC-AC inverter 135 corresponding to the temperature conditions specified by the PV array application.

Figure 2:
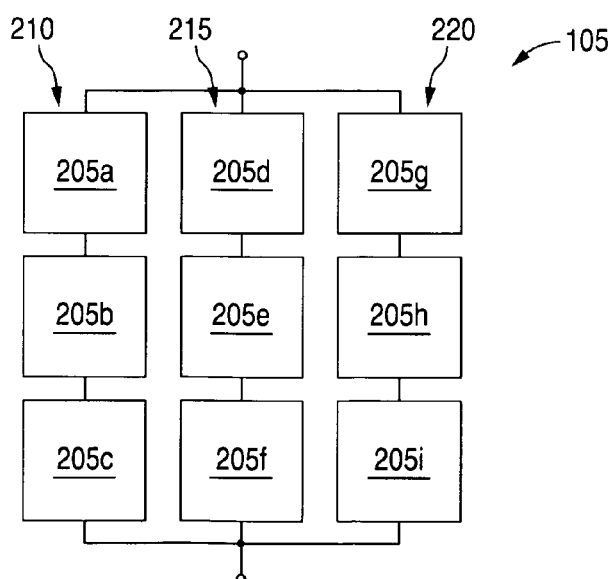
FIG. 2 illustrates an example solar panel according to embodiments of this disclosure.

FIG. 2 illustrates an example solar panel 105 according to embodiments of this disclosure. The embodiment of the solar panel 105 shown in FIG. 2 is for illustration only. Other embodiments of the solar panel 105 could be used without departing from the scope of this disclosure.

Each solar panel 105 includes a number of PV cells 205a-205i (referred to collectively as PV cells 205) arranged in series, in parallel, or both. For example, a first string 210 of PV cells is formed when PV cells 205a, 205b and 205c are coupled in series. A second string 215 of PV cells is formed when PV cells 205d, 205e and 205f are coupled in series. A third string 220 of PV cells is formed when PV cells 205g, 205h and 205i are coupled in series. Thereafter, the first string 210, second string 215 and third string 220 are coupled in parallel to form the solar panel 105.

The PV cells 205 are semiconductor devices that convert light directly into energy. When light shines on a PV cell 205, a voltage develops across the cell, and a current flows through the cell when connected to a load. The voltage and current vary with several factors, including the physical size of the cell, the amount of light shining on the cell, the temperature of the cell, and external factors. PV modules are coupled together such that each solar panel includes a positive potential (e.g., voltage).

Returning to FIG. 1, in some embodiments, each solar panel 105 is coupled on its output terminals to a Panel Dedicated Converter (PDC) 120. The PDC 120 includes a DC-DC converter 125 coupled to the solar panel 105. Accordingly, the voltage across DC-DC converters 125 coupled in series is the string voltage, and the current through the DC-DC converters 125 coupled in series is the string current. The DC-DC converter 125 is configured to provide power boosting for the solar panel 105. The DC-DC converter 125 converts the power to a voltage or current level that is more suitable to whatever load the system is designed to drive. For example, the DC-DC converter 125 performs two to one (2:1) boosting of the voltage received from the solar panel 105. In such example, the solar panel 105 is configured to output a voltage in a range of thirty volts (30V) to fifty volts (50V) (e.g., output voltage may depend on amount of sunlight received at the solar panel 105). The DC-DC converter 125 boosts the voltage to a corresponding range of sixty volts (60V) to one hundred volts (100V) (e.g., when a high-voltage converter). In an additional example, the solar panel is configured to output a voltage in a range of one volt (1V) to thirty volts (30V). The DC-DC converter 125 boosts the voltage to a corresponding range of two volts (2V) to sixty volts (50V) (e.g., when a low-voltage converter).

The PDC 120 also includes an over-voltage protection circuit (OVPC) 130 coupled to the DC-DC converter 125. In some embodiments, the OVPC 130 is internal to the DC-DC converter 125. In additional embodiments, the OVPC 130 is external to the DC-DC converter 125. The OVPC 130 is configured to sense the output voltage slew rate of the DC-DC converter 125. The output voltage slew rate represents the maximum rate of change of the output voltage signal at any point. The OVPC 130 detects sudden and/or large transients in the output voltage slew rate of the DC-DC converter 125. The OVPC 130 is operable to regulate the output voltage of the DC-DC converter 125. The OVPC 130 sends control signals to the DC-DC converter 125 that limit the duty cycle of the DC-DC converter 125 to slow the output voltage slew rate to a desired output voltage slew rate.

Figure 3:
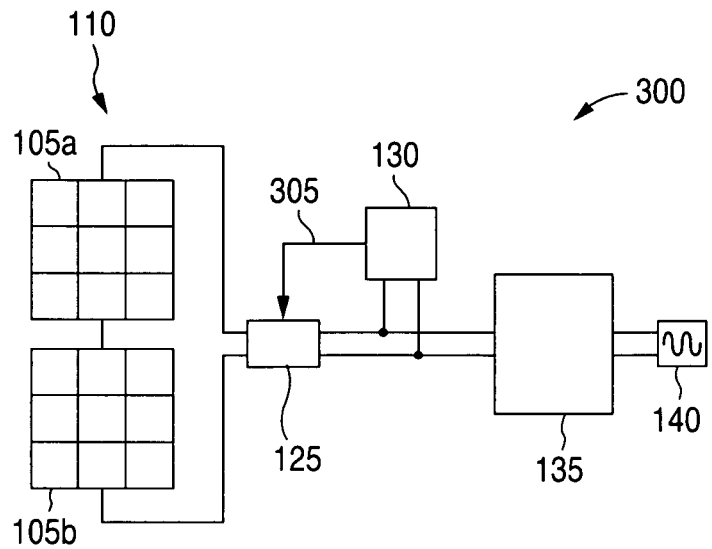
FIG. 3 illustrates another example PV array system according to embodiments of this disclosure.

FIG. 3 illustrates another example PV array system 300 according to embodiments of this disclosure. The embodiment of the PV array system 300 shown in FIG. 3 is for illustration only. Other embodiments of the PV array system 300 could be used without departing from the scope of this disclosure.

The PV array system 300 includes a number of solar panels 105a-105b (referred to collectively as solar panels 105). The solar panels 105 are arranged in series, in parallel, or both (in series within a string 110 in this example). It will be appreciated that illustration of one string 110 including two solar panels 105 is for example purposes only, and embodiments including multiple strings 110 including any number of solar panels 105 could be used without departing from the scope of this disclosure.

In some embodiments, a DC-DC converter 125 is coupled to each string 110. In additional and alternative embodiments, the DC-DC converter 125 is coupled to multiple strings 110. In some embodiments, the OVPC 130 is external to the DC-DC converter 125. The OVPC 130 is coupled to the DC-DC converter 125 such that the OVPC 130 senses the output voltage slew rate of the DC-DC converter 125 and regulates the DC-DC converter 125 via a control signal 305. In some embodiments (not shown), the DC-DC converter 125 includes the OVPC 130.

The OVPC 130 senses the output voltage slew rate of the DC-DC converter 125. The OVPC 130 detects sudden and/or large transients in the output voltage slew rate of the DC-DC converter 125. The OVPC 130 is operable to regulate the output voltage of the DC-DC converter 125. The OVPC 130 sends control signals to the DC-DC converter 125 that limit the duty cycle of the DC-DC converter 125 to slow the output voltage slew rate to a desired output voltage slew rate.

Figure 4:
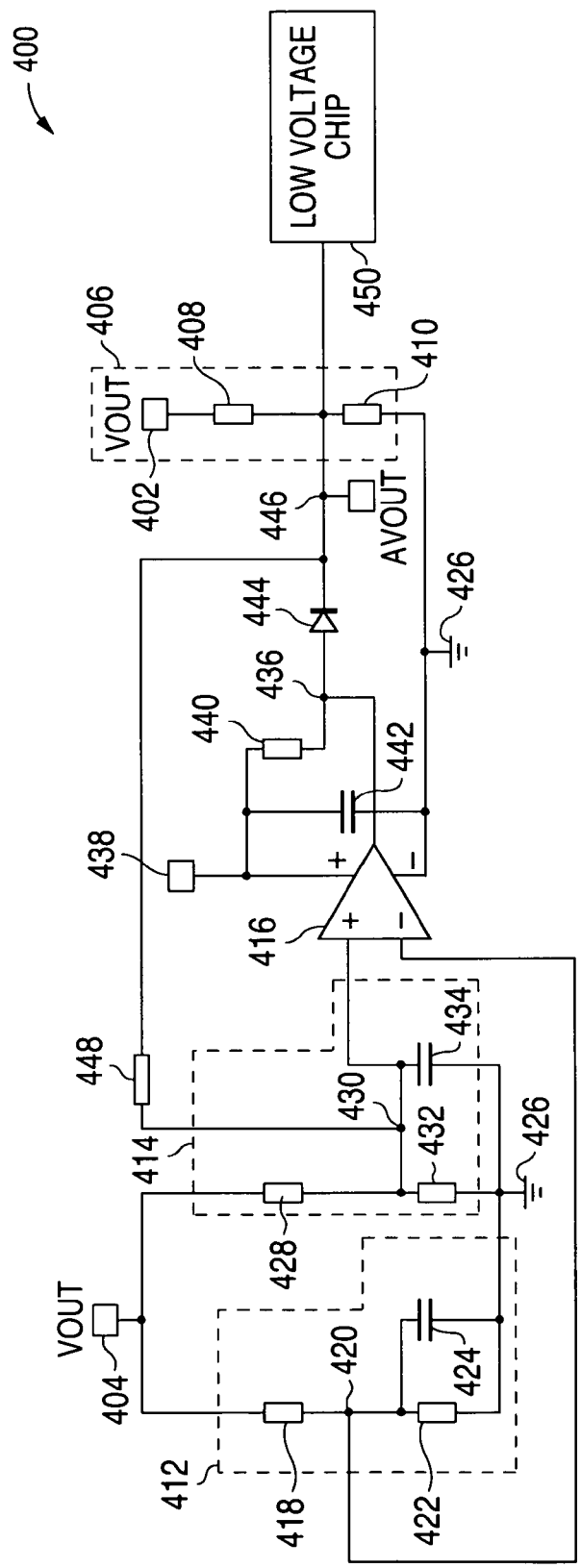
FIG. 4 illustrates an example analog over-voltage protection circuit (OVPC) according to embodiments of this disclosure.

FIG. 4 illustrates an example analog OVPC 400 according to embodiments of this disclosure. The embodiment of the analog OVPC 400 shown in FIG. 4 is for illustration only. Other embodiments of the analog OVPC 400 could be used without departing from the scope of this disclosure.

The OVPC 400 includes a first interface 402 configured to sense the voltage output slew rate of the DC-DC converter 125. The OVPC 400 also includes a second interface 404 configured to sense the output slew rate of the DC-DC converter 125. The first interface 402 is coupled to a voltage divider circuit 406. The voltage divider circuit 406 includes a first resistor 408 and a second resistor 410. The second interface 404 is coupled to a first voltage input circuit 412 and a second voltage input circuit 414. The first voltage input circuit 412 is coupled to the inverting terminal of an operational amplifier (op-amp) 416. The second voltage input circuit 414 is coupled to the non-inverting terminal of the op-amp 416.

The first voltage input circuit 412 includes a voltage divider circuit, where a first resistor 418 is coupled to a node 420 and a second resistor 422 is coupled in parallel with a first capacitor 424 between the node 420 and ground 426. The second voltage input circuit 414 includes a voltage divider circuit, where a first resistor 428 is coupled to a node 430 and a second resistor 432 is coupled in parallel with a second capacitor 434 between the node 430 and ground 426. The node 420 of the first voltage input circuit 412 is coupled to the inverting terminal of the op-amp 416, while the node 430 of the second voltage input circuit 414 is coupled to the non-inverting terminal of the op-amp 416.

The output of the op-amp 416 is coupled to a threshold node 436. The positive power supply of the op-amp 416 is coupled to a five-volt (5V) source 438. The negative power supply of the op-amp 416 is coupled to ground 426. Additionally, a third capacitor 442 is coupled between the positive power supply of the op-amp 416 and the negative power supply of the op-amp 416. Further, a threshold resistor 440 is coupled between the positive power supply of the op-amp 416 and the threshold node 436.

A diode 444 is coupled from the threshold node 436 to an AV output node 446 disposed in the voltage divider 406 (e.g., the node coupling the resistor 408 and the resistor 410). A hysteresis resistor 448 is coupled between the AV output node 446 and the non-inverting terminal of the op-amp 416. Further, a low voltage controller 450 is coupled to the AV output node 446.

The analog OVPC 400 is coupled to the DC-DC converter 125. In some embodiments, the DC-DC converter 125 includes the OVPC 400. The OVPC 400 couples to the DC-DC converter 125 such that the first and second interfaces 402, 404 each sense the output voltage of the DC-DC converter 125. The output voltage is applied to each of the voltage input circuits 412, 414. The voltage at each node 420 and 430 rises with respect to the capacitance of the voltage input circuit 412, 414. As such, the capacitor 424 and the capacitor 434 are sized relationally to program voltage slew rate limits. For example, the capacitor 424 can be sized to fifty micro-farads (50 µF), and the capacitor 434 can be sized to eighteen nano-farads (18 nF).

At steady state, the voltage at the inverting terminal (e.g., node 420) of the op-amp 416 is maintained at a voltage higher than the voltage at the non-inverting terminal (e.g., node 430) of the op-amp 416. The resistors 418, 422, 428, and 432 are sized such that the voltage at node 420 is slighter higher than the voltage at node 430. For example, the resistors 418, 422, 428, and 432 can be sized such the voltage at node 420 is one-hundred millivolts (100 mV) higher than the voltage at node 430. Therefore, since the voltage at the non-inverting terminal is less than the voltage at the inverting terminal, the op-amp 416 does not output a voltage onto the threshold node 436, and the circuit is disabled.

When an over-voltage condition occurs, the voltage at node 430 rises faster than the voltage at node 420 as a result of the sizing of the capacitors 434 and 424. If the output voltage, as sensed at the second interface 404, increases by a delta voltage, the voltage at the non-inverting terminal of the op-amp 416 becomes greater than the voltage at the inverting terminal of the op-amp 416. For example, once the output voltage of the DC-DC converter 125 increases by three volts for a forty volt output voltage (i.e., ΔV=3V at 40V) with a minimum slew rate of five volts per second (5V/S) as set by the capacitors 424 and 434, the op-amp 416 outputs a voltage onto the threshold node 436. The threshold resistor 440 is sized such that the voltage added to the threshold node 436 will not trigger the OVPC 400 during startup. Once the op-amp 416 outputs voltage onto the threshold node 436 that is higher than the threshold as set by the resistor 440, the AV output node 446 simulates a soft over-voltage condition. The low voltage controller 450 detects the soft over-voltage condition on the AV output node 446 and regulates the DC-DC converter 125.

Thereafter, as the voltage on the capacitor 424 increases, the voltage at node 420 reaches, and exceeds by a minor amount, the voltage at node 430. Accordingly, as the voltage at node 420 exceeds the voltage at node 430, the corresponding voltage on the inverting terminal of the op-amp 416 exceeds the voltage on the non-inverting terminal of the op-amp 416. As result, the op-amp 416 discontinues outputting voltage onto the threshold node 436, and the circuit disables.

The hysteresis resistor 448 operates to introduce hysteresis into the OVPC 400. Hysteresis can be used to filter signals so that the output reacts slowly by taking recent history into account. This prevents rapid switching on and off as the voltage drifts around the threshold point. Some amount of hysteresis is intentionally added to the OVPC 400 to prevent unwanted rapid switching.

Figure 5:
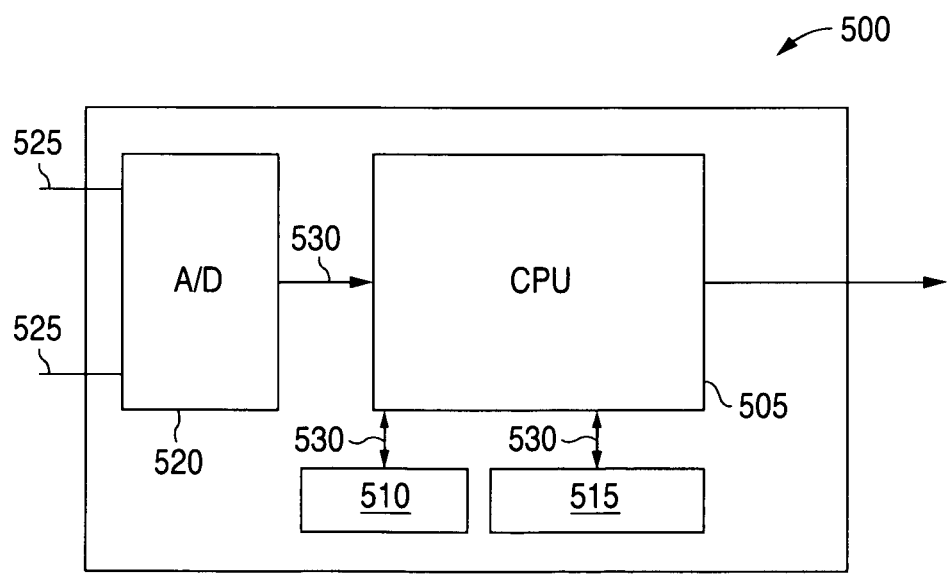
FIG. 5 illustrates an example digital OVPC according to embodiments of this disclosure.

FIG. 5 illustrates an example digital OVPC 500 according to embodiments of this disclosure. The embodiment of the digital OVPC 500 shown in FIG. 5 is for illustration only. Other embodiments of the digital OVPC 500 could be used without departing from the scope of this disclosure.

The OVPC 500 includes a central processing unit ("CPU") 505, a memory unit 510, an input/output ("I/O") interface 515, an analog-to-digital ("A/D") converter 520, and one or more input terminals 525. The input terminals 525 are configured to sense (e.g., detect and/or measure) voltage at the output of the DC-DC converter 125. Components of the OVPC 500 are interconnected by one or more communication links 530 (e.g., a bus). It is understood that the OVPC 500 may be differently configured and that each of the listed components may actually represent several different components. For example, the CPU 505 may actually represent a multiprocessor or a distributed processing system. The memory unit 510 may include different levels of cache memory, main memory, hard disks, and remote storage locations. The I/O interface 515 may include monitors, keyboards, and the like. Additionally, the memory unit 510 stores a plurality of instructions configured to cause the CPU 505 to perform one or more of the functions of the OVPC 500 outlined below. The memory unit 510 also is capable of storing one or more sensed values for signals received via input terminals 525 and digitized by A/D converter 520. Additionally, the memory unit 510 is capable of storing threshold values and desired voltage slew rates.

The OVPC 500 is coupled to the DC-DC converter 125. In some embodiments, the DC-DC converter 125 includes the OVPC 500. The input terminals 525 are configured to sense the output voltage of the DC-DC converter 125. The input terminals 525 forward signals corresponding to the output voltage to the A/D converter 520. The A/D converter 520 converts the analog signals received from the input terminals 525 into one or more digital signals representing the output voltage of the DC-DC converter 125. The I/O interface 515 enables an operator to enter, store, and change a threshold voltage slew rate, desired voltage slew rate, hysteresis parameter, other values, or a combination of these.

The CPU 505 receives the digital signals from the A/D converter 520. The CPU 505 determines if the digital signals reflect a change in the output voltage of the DC-DC converter 125. In some embodiments, the CPU 505 stores the signals in the memory unit 510. The CPU 505 determines the rate of change in the output voltage of the DC-DC converter 125 by taking samples of the digital signals at specified intervals. For example, the CPU 505 can sample the digital signal one hundred times per second, one thousand times per second or some other sampling frequency. In some embodiments, the A/D converter 520 performs the sampling, and the CPU 505 reads all the digital signals received from the A/D converter 520.

The CPU 505 compares a determined output voltage slew rate with a threshold voltage slew rate stored in the memory unit 510. The output voltage slew rate represents the maximum rate of change of a signal (e.g., the digital signal representing the output voltage) at any point in the signal. If the CPU 505 determines that the voltage slew rate of the DC-DC converter 125 exceeds a threshold voltage slew rate, the CPU 505 sends control signals to regulate the output of the DC-DC converter 125. For example, the CPU 505 can limit the duty cycle of the DC-DC converter 125 such that the output of the DC-DC converter 125 is slowed.

In some embodiments, the DC-DC converter 125 sends values corresponding to the output voltage to the OVPC 500. In such embodiments, the DC-DC converter 125 may be configured with an A/D converter 520, and the OVPC 500 receives digitized signals via the input interfaces 525. Accordingly, in such embodiments, the OVPC 500 may not include the A/D converter 520.

Further, the CPU 505 is configured to implement a hysteresis in the process. The CPU 505 filters the digital signals and reacts slowly by taking recent history into account. This prevents rapid switching on and off as the voltage drifts around the threshold point. Some amount of hysteresis is intentionally added to the OVPC 500 to prevent unwanted rapid switching.

Once the OVPC 130 (e.g., OVPC 400 or 500) detects an over-voltage event (such as, but not limited to, a voltage spike or large transient voltage), the OVPC 130 reduces or avoids over-voltage by reducing the duty cycle of the DC-DC converter 125. The OVPC 130 can vary the duty cycle of the DC-DC converter 125 by forcing the conversion ratio to be a specific value, limiting the duty cycle of the DC-DC converter 125, varying the duty cycle of the DC-DC converter 125 by an amount proportional to the output voltage or the output voltage slew rate, setting the output of the DC-DC converter 125 to a maximum output voltage, or any combination of the above.

As an example, the OVPC 130 can set the conversion ratio of the DC-DC converter 125 to a specific value, such as (but not limited to) one (e.g., 1:1). Therefore, the OVPC 130 forces the DC-DC converter 125 not to boost the voltage from the solar panel 105. When the solar panel 105 is configured to output a voltage in the range of 30V-50V, the DC-DC converter 125 outputs a corresponding voltage in the range of 30V-50V. Additionally, when the solar panel 105 is configured to output a voltage in the range of 1V-30V, the DC-DC converter 125 outputs a corresponding voltage in the range of 1V-30V.

Additionally and alternatively, the OVPC 130 can vary the duty cycle of the DC-DC converter 125 by an amount proportional to a desired output voltage slew rate. Given a certain voltage slew rate threshold, the OVPC 130 regulates the duty cycle of the DC-DC converter 125 to operate the system at a current that corresponds to a desired output voltage slew rate.

Furthermore, the OVPC 130 can limit the output voltage of the DC-DC converter 125 to a maximum value. For example, the voltage of the DC-DC converter 125 can be limited to a maximum of 100V when coupled to a solar panel 105 configured to output voltage in the range of 30V-50V. Additionally and alternatively, the voltage of the DC-DC converter 125 can be limited to a maximum of 50V when coupled to a solar panel 105 configured to output voltage in the range of 1V-30V.

Figure 6:
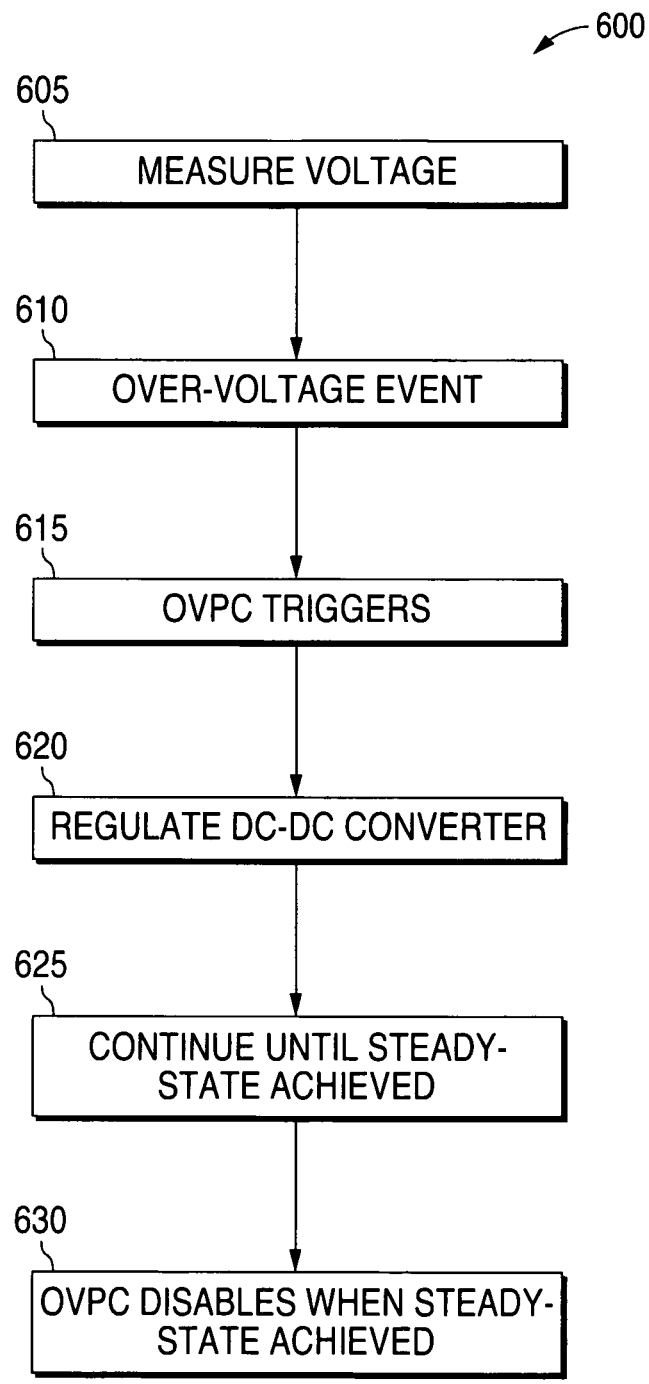
FIG. 6 illustrates an example over-voltage protection process in a PV array according to embodiments of this disclosure.

FIG. 6 illustrates an example over-voltage protection process 600 in a PV array according to embodiments of this disclosure. The embodiment of the over-voltage protection process 600 shown in FIG. 6 is for illustration only. Other embodiments of the over-voltage protection process 600 could be used without departing from the scope of this disclosure.

The OVPC measures the output voltage of the DC-DC converter in step 605. The OVPC 130 (i.e., 400 or 500) is configured to detect a voltage slew rate. The voltage slew rate represents the maximum rate of change of the output voltage at any point in the signal. The OVPC is configured to trigger in response to the voltage slew rate exceeding a threshold value. For example, the OVPC triggers when the DC-DC converter output voltage increases by a ΔV (set at 3 volts at a 40 volt output) with a minimum voltage slew rate (set at 5 volts per second). In some embodiments, the OVPC 130 stores the measured voltage, the threshold, or both in the memory unit 510.

In step 610, an over-voltage event occurs. As a result of the over-voltage event, a large transient in the output voltage (or a spike in the voltage) appears. As a result of the over-voltage event, the OVPC triggers in step 615. The OVPC 130 determines that the rate of change in the output voltage exceeds the threshold value.

The OVPC regulates the DC-DC converter in step 620. The OVPC 310 sends a control signal to the DC-DC converter 125. The control signal regulates the output of the DC-DC converter 125. For example, the duty cycle of the DC-DC converter 125 is limited to slow the output voltage of the DC-DC converter 125 to a desired voltage slew rate.

The OVPC continues to regulate the DC-DC converter until steady state is achieve in step 625. The OVPC 130 continues to monitor the output voltage of the DC-DC converter 125 to determine when the output voltage is stabilized. The OVPC 130 continues to send the control signal to regulate the output of the DC-DC converter 125. Further, the OVPC 130 is configured to prevent rapid switching if the rate of change of the output voltage is near the threshold value. Once the output voltage of the DC-DC converter reaches steady state, the OVPC disables (e.g., shuts off) in step 630.

Although this disclosure has described various example embodiments, various changes and modifications may be suggested to one skilled in the art. It is intended that this disclosure encompass such changes and modifications as fall within the scope of the appended claims.

What is claimed is:

1. A photovoltaic array for use in an electrical power system, the photovoltaic array comprising:
    at least one string of multiple photovoltaic modules connected in series;
    an inverter configured to couple power from the string of modules to a load;
    at least one of the multiple modules having an associated voltage converter and an associated over-voltage protection circuit:
        the voltage converter configured to convert power output from the module to the string; and
        the over-voltage protection circuit comprising:
            a spike detector configured to detect a string over-voltage event based on a rate of change of the output voltage of the voltage converter (output voltage slew rate) exceeding a threshold value; and
            a voltage control module configured to regulate the output voltage slew rate of the voltage converter in response to the string over-voltage event, thereby limiting the output voltage slew rate of the voltage converter to less than the threshold value.

2. The photovoltaic array as set forth in claim 1, wherein the spike detector includes:
    an analog-to-digital converter configured to convert the output voltage of the voltage converter into a digital output voltage representation; and
    a digital detection module configured to detect, in response to the digital output voltage representation, the string over-voltage event.

3. The photovoltaic array as set forth in claim 1, wherein the voltage converter includes the over-voltage protection circuit.

4. The photovoltaic array as set forth in claim 1, wherein the spike detector includes:
    an amplifier with first and second inputs;
    a first voltage input circuit coupled to the first input; and
    a second voltage input circuit coupled to the second input;
    the first and second voltage input circuits configured to establish the threshold value of the output voltage slew rate
    wherein the amplifier is configured to signal the string over-voltage event in response to detecting a difference between a voltage from the first voltage input circuit and a voltage from the second voltage input circuit as indicating that the output voltage slew rate exceeds the threshold value.

5. The photovoltaic array as set forth in claim 4, wherein establishing the threshold value of the output voltage slew rate comprises cooperatively sizing respective capacitors in the first and second voltage input circuits.

6. The photovoltaic array as set forth in claim 4, further comprising:
    a hysteresis circuit configured to hysteretically control signaling successive string over-voltage events.

7. The photovoltaic array as set forth in claim 1, wherein the voltage control module is configured to limit a duty cycle of the voltage converter.

8. A device for use in a solar cell power system including at least one string of multiple photovoltaic modules connected in series, and an inverter configured to couple power from the string of modules to a load, at least one module operable with the device, the device comprising:
    a voltage converter coupled to the associated module, and configured to convert power output from the module to the string;
    an over-voltage protection circuit coupled to the voltage converter comprising:
        a spike detector configured to detect a string over-voltage event based on a rate of change of the output voltage of the voltage converter (output voltage slew rate) exceeding a threshold value; and
        a voltage control module configured to regulate the output voltage slew rate of the voltage converter in response to the string over-voltage event, thereby limiting the output voltage slew rate of the voltage converter to less than the threshold value.

9. The device as set forth in claim 8, wherein the spike detector includes:
    an analog-to-digital configured to convert the output voltage of the voltage converter into a digital output voltage representation; and
    a digital detection module configured to detect, in response to the digital output voltage representation, the string over-voltage event.

10. The device as set forth in claim 8, wherein the spike detector includes:
    an amplifier with first and second inputs;
    a first voltage input circuit coupled to the first input; and
    a second voltage input circuit coupled to the second input;
    the first and second voltage input circuits configured to establish the threshold value of the output voltage slew rate
    wherein the amplifier is configured to signal the string over-voltage event in response to detecting a difference between a voltage from the first voltage input circuit and a voltage from the second voltage input circuit as indicating that the output voltage slew rate exceeds the threshold value.

11. The device as set forth in claim 10, wherein establishing the threshold value of the output voltage slew rate comprises cooperatively sizing respective capacitors in the first and second voltage input circuits.

12. The device as set forth in claim 10, further comprising:
    a hysteresis circuit configured to hysteretically control signaling successive string over-voltage events.

13. The device as set forth in claim 8, wherein the voltage control module is configured to limit a duty cycle of the voltage converter.

14. The device as set forth in claim 8, wherein the voltage converter includes the over-voltage protection circuit.

15. A method for string over-voltage avoidance in a photovoltaic array that includes at least one string of multiple photovoltaic modules connected in series, and that includes an inverter configured to couple power from the string to a load, each of the modules having an associated voltage converter configured to convert power output from the module to the string, the method at each module of the array comprising:

sensing an output voltage of the associated voltage converter;

detecting a string over-voltage event based on a rate of change of the output voltage of the voltage converter (output voltage slew rate) exceeding a threshold value; and regulating the output voltage slew rate of the voltage converter in response to the detection of the string over-voltage event, thereby limiting the output voltage slew rate of the voltage converter to less than the threshold value.

16. The method set forth in claim 15, wherein sensing the output voltage of the voltage converter comprises:

converting analog measurements of the output voltage into digital signals representing the output voltage; and sampling the digital signals at a specified sampling frequency.

17. The method as set forth in claim 15, wherein detecting the string over-voltage event comprises:

generating first and second voltages such that a difference between the first and second voltages corresponds to the output voltage slew rate; and signaling the string over-voltage event when the difference between the first and second voltages corresponds to the output voltage slew rate exceeding the threshold value.

18. The method as set forth in claim 15, further comprising:

hysteretically controlling signaling successive string over-voltage events.

19. The method as set forth in claim 15, wherein regulating the output voltage slew rate of the voltage converter comprises limiting a duty cycle of the voltage converter.

* * * * *